Sept. 30, 1924.  W. E. VAIL  1,510,357
TRACTION WHEEL
Filed March 21, 1924   2 Sheets—Sheet 1
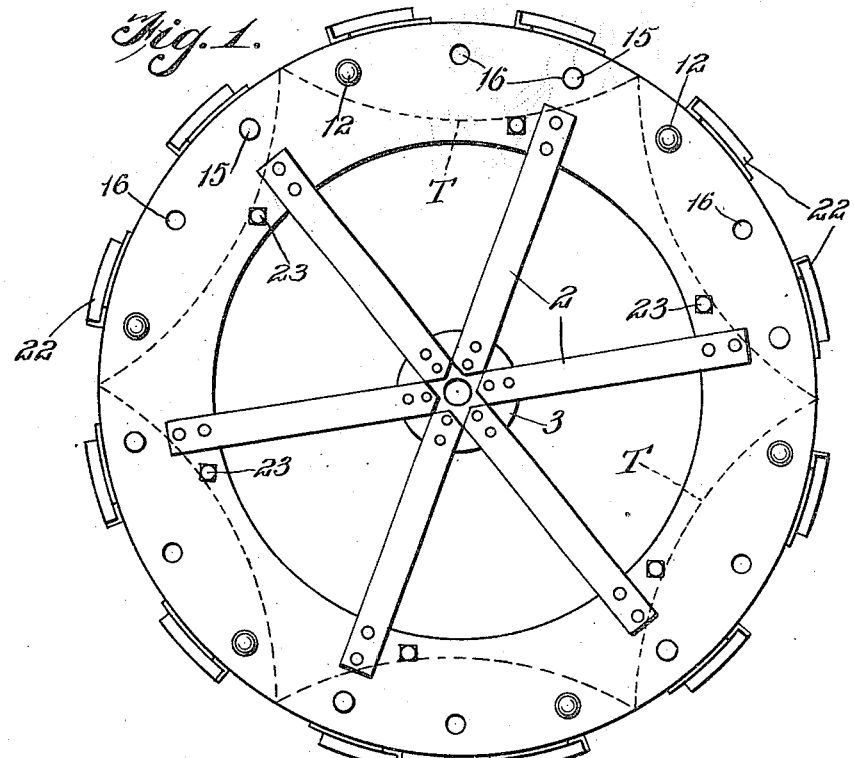
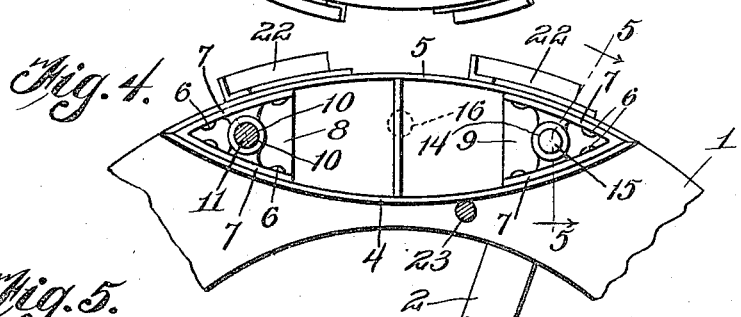
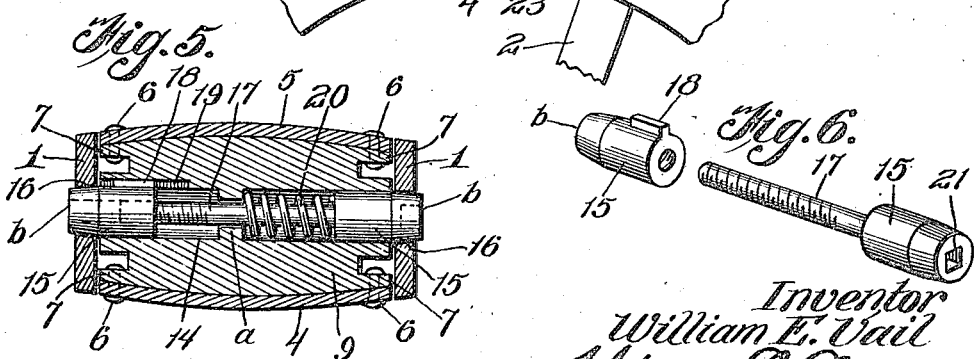
Inventor
William E. Vail
Watson E. Coleman
Atty Sept. 30, 1924.  
W. E. VAIL  
TRACTION WHEEL  
Filed March 21, 1924  
1,510,357  
2 Sheets-Sheet 2

Inventor  
William E. Vail  
Watson E. Coleman  
Atty

Patented Sept. 30, 1924.

UNITED STATES PATENT OFFICE.

WILLIAM E. VAIL, OF RONCEVERTE, WEST VIRGINIA.

TRACTION WHEEL.

Application filed March 21, 1924. Serial No. 700,879.

*To all whom it may concern:*

Be it known that I, WILLIAM E. VAIL, a citizen of the United States, residing at Ronceverte, in the county of Greenbrier and State of West Virginia, have invented certain new and useful Improvements in Traction Wheels, of which the following is a specification, reference being had to the accompanying drawings.

This invention relates to certain improvements in traction wheels and has relation more particularly to a device of this general character especially designed and adapted for use in connection with motor driven vehicles and it is an object of the invention to provide a novel and improved wheel of this general character wherein the tread is sectional and each of said sections reversible so that the wheel may be readily provided with either a smooth tread or with a cleated or calked surface.

Another object of the invention is to provide a novel and improved device of this general character wherein each of the sections of the rim carries a locking means coacting with the body of the wheel for locking said section in either of its two positions together with means for mounting said tread section in a manner whereby the desired reversing of the section, when released or unlocked, is accomplished in substantially an automatic manner.

An additional object of the invention is to provide a novel and improved device of this general character wherein the tread comprises a plurality of reversible sections together with means carried by the wheel proper for effectively bracing or reinforcing each of said sections in a manner to effectively offset hard usage in transit.

The invention consists in the details of construction and in the combination and arrangement of the several parts of my improved traction wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation of a wheel constructed in accordance with an embodiment of my invention with the tread sections arranged to present a cleated or calked tread;

Figure 4 is a view partly in section and partly in elevation illustrating one of the tread sections in applied position;

Figure 5 is an enlarged detailed sectional view taken substantially on the line 5—5 of Figure 4, looking in the direction of the arrow;

Figure 6 is a view in perspective of the locking wedges associated with each of the tread sections unapplied and separated.

Figure 2:
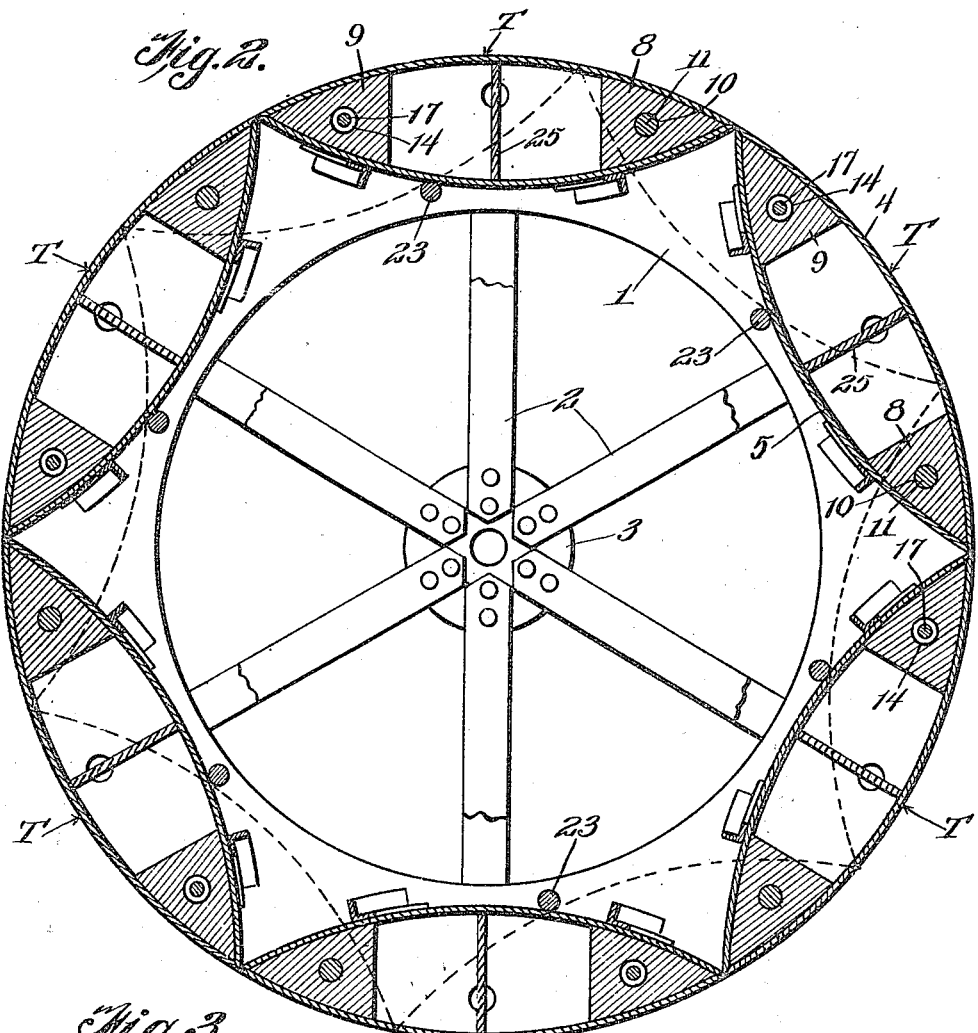
Figure 2 is a sectional view taken through the structure as illustrated in Figure 1 with the tread sections in position to present a smooth surface.

As disclosed in the accompanying drawings, the body of the wheel comprises two annular rim plates 1 of equal radii and spaced apart a desired distance, said plates 1 being connected through the medium of the spokes 2 with the hub 3. As the construction of the spokes 2 and hub 3 form no particular part of the present invention a detailed description and illustration thereof is believed unnecessary.

Interposed between the plates 1 is a plurality of tread sections T of similar construction and herein disclosed as six in number although I do not wish to be understood as limiting myself to this exact number as this will depend upon the preferences in practice.

As the sections T are of similar construction it is believed that a detailed description of one will suffice for the purposes of disclosure.

Each of the sections T comprises a pair of longitudinally curved plates 4 and 5, such curvature of each of the plates being on the same radius as the periphery of each of the plates 1 so that in either of the positions of the section T a plate 4 or 5 will be substantially flush with the peripheral edges of the plates 1.

As is clearly illustrated in the accompanying drawings, the convex faces of the plates 4 and 5 are oppositely disposed and as is particularly illustrated in Figure 5 it is preferred that each of the plates 4 and 5 be also curved in cross section with the convex face outwardly disposed in order to assure proper traction contact with the roadway and particularly as pertains to the smooth plate 4 so that as the wheel travels over a hard roadway with the plate 4 outwardly disposed it is assured that a minimum of wear will be imposed upon the road surface.

The extremities of the plates 4 and 5 are in close contact and are maintained in desired assembled relation by the rivets 6 disposed through the end portions of the plates 4 and 5 and the end flanges 7 provided at the opposite end portions of the interposed blocks 8 and 9. The blocks 8 and 9 are snugly engaged between the plates 4 and 5 at the opposite ends thereof.

One of the blocks, as 8, has disposed lengthwise therethrough and at substantially its axial center the opening 10 through which is directed a pintle 11 also disposed through the peripheral portions of the plates 1 whereby the section T is supported at one end portion for swinging movement whereby said section may be readily adjusted to expose either the plate 4 or 5 as may be preferred.

Each outer end portion of the pintle 11 is headed or upset, as at 12, so that said pintle together with its associated section T will be effectively maintained against complete displacement with respect to the plates 1.

The second block 9 also has disposed lengthwise therethrough and at substantially its axial center an opening or bore 14, the intermediate portion of which being reduced at substantially its central part to provide an internal annular shoulder $a$.

Working within the opposite end portions of the opening or bore 14 are the locking members 15 having their outer extremities $b$ inwardly tapered to provide a wedge end and when the members 15 are outwardly projected or extended, said tapered portions or wedge ends $b$ are engaged within the openings 16 provided in the plates 1, the wall of each of said openings being tapered complemental to the taper of the portion or end $b$. By this means, the members 15 operate to effectively lock the section T in either of its two positions, it being understood that the openings 16 are so positioned in the plates 1 to receive the portions $b$ of the members 15 when said section T is in either of its positions.

One of the members 15 is provided at one end and at its axial center with an extension rod or shank 17 of a length to have threaded upon its outer end portion the second member 15. This second member 15 is provided with an outstanding key 18 engaged within a groove or key way 19 formed in the wall of the adjacent portion of the opening or bore 14 whereby this second member 15 is held against rotation. The groove or key way 19, however, is of such a length as to permit the second member 15 to have movement lengthwise of the opening or bore 14 to permit the second member to be engaged or disengaged from the opening 16 in the adjacent plate 1.

Interposed between the shoulder $a$ and the inner end of the first member 15 is an expansible member 20 herein disclosed as a coil spring encircling the rod or shank 17.

When the section T is to be changed from one of its positions to the other it is to be understood that the members 15 must be first disengaged from the plates 1. The outer face of the first member 15 as herein disclosed is provided with a socket 21 in which is adapted to be engaged a speed wrench or the like and upon requisite rotation of this first member 15 the threaded engagement between the rod or shank 17 with the second member 15 will cause said second member 15 to move inwardly of the opening or bore 14 until the same is free of the adjacent plate 1 and when the key 18 reaches the inner end of the key way or groove 19 and is thereby held against further inward movement, the continued rotation of the first member 15 will cause said member 15 to move inwardly until it is completely disengaged from its adjacent plate 1.

As the members 15 are moved into their released position the spring 20 is placed under compression so that during the period the members 15 are in release the same are effectively held against endwise movement within the opening or bore 14 to prevent either of said members 15 having sufficient outward movement to again engage within an opening 16.

After the section T has been reversed the speed wrench or the like is then engaged within the socket 21 and upon proper rotation the second member 15 is caused to move outwardly until it is properly engaged within the opening 16 of the adjacent plate 1 and upon continued rotation the first member 15 will then move outwardly into proper engagement within the opening 16 in the plate 1 adjacent thereto.

As particularly illustrated in Figure 1 of the drawings, the plates 5 are outwardly disposed as to present for working the calks or cleats 22 secured thereto and which adjustment of the section is desired when the wheel is travelling over snow, ice or in the fields or other rough roadways. However, when the wheel is adapted to traverse a hard road the section T is reversed to present for working the smooth plates 4 and thereby comply with the road and traffic regulations of major states of most communities.

Figure 3:
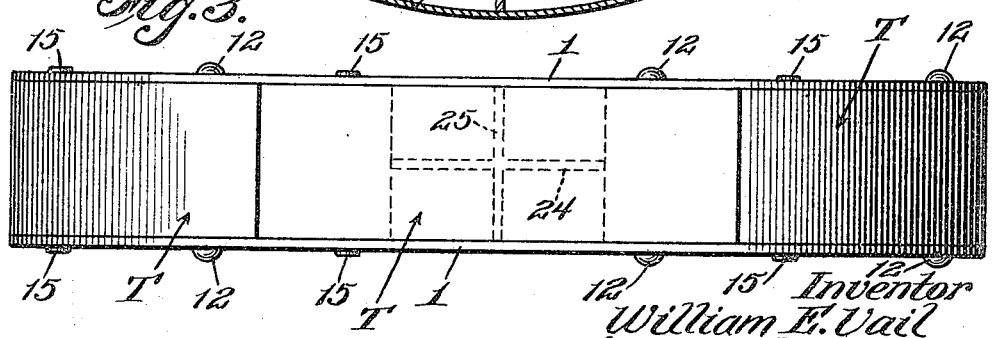
Figure 3 is a view in top plan of the structure as illustrated in Figure 2, the reinforcing or bracing means contained within a tread section being indicated by broken lines.

With the plates 4 arranged in working position, as particularly illustrated in Figures 2 and 3 and it is desired to reverse the positions of the sections T, the holding members 15 of each of the sections are released, which operation can be done in a comparatively short period of time, and as the wheel continues to advance the sections will automatically swing to the desired second position due to the impetus offered thereto by the rotation of the wheel and also to the fact that each of said sections is pivotally supported at one end portion. After all of the sections have been reversed, the members 15 of each of the sections are then caused to extend to have requisite locking engagement with the requisite opening 16. With the plates 5 outwardly disposed and it is desired to reverse the positions of the sections T, the wheel W is caused to have retrograde or backward movement after the holding members 15 have been released whereupon the desired reversal will be effected in the same manner as just referred to with respect to the first reversal of the sections T.

In order to brace or reinforce each of the sections T against undue stress imposed thereupon when the wheel is in transit I dispose between each of the plates 1 and in connection with each of the sections T a bar or rod 23, said bar or rod being so positioned that with the section T in either of its two positions the inner plate 4 or 5 may have close contact with said bar or rod.

I also find it of importance to effectively reinforce the plates 4 and 5 of each of the sections and as herein disclosed I accomplish this advantageous result by interposing between the plates 4 and 5 the longitudinally disposed web 24 of a length to extend between the inner or opposed faces of the blocks 8 and 9 and with the transversely disposed webs 25 arranged at the opposite sides of the web 24 and preferably at the longitudinal center thereof. The webs 24 and 25 may be held in working position in any desired manner preferably by rivets although I do not wish to be understood as limiting myself in this respect.

From the foregoing description it is thought to be obvious that a traction wheel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A wheel comprising spaced rim plates, a plurality of tread sections interposed therebetween, means for pivotally supporting each of said sections by the plates, each of said sections having oppositely arranged surfaces adapted to be positioned to serve as the tread of the wheel, and laterally movable locking means carried by each of the sections engageable with the rim for holding the section in either of its two positions.

2. A wheel comprising spaced rim plates, a plurality of tread sections interposed therebetween, means for pivotally supporting each of said sections by the plates, each of said sections having oppositely arranged surfaces adapted to be positioned to serve as the tread of the wheel, and laterally movable locking means carried by each of the sections engageable with the rim for holding the section in either of its two positions, the pivotal mounting of each of the sections being adjacent to an end thereof and the locking means carried thereby being adjacent to the opposite end of the section.

3. A wheel comprising spaced rim plates, a plurality of tread sections interposed therebetween, means for pivotally supporting each of said sections of the plates, each of said sections having oppositely arranged surfaces adapted to be positioned to serve as the tread of the wheel, and a bracing means coacting with the inner face of the tread section when said section is in either of its two positions.

4. A wheel comprising spaced rim plates, a plurality of tread sections interposed therebetween, each of said sections being reversible, means for holding said section in fixed position between the plates when the section is in either of its two positions, each of said sections having oppositely arranged surfaces adapted to be positioned to serve as the tread of the wheel, each of said sections comprising two longitudinally curved plates, said plates being each on substantially the same radii, blocks interposed between the opposite end portions of the plates and secured thereto, means coacting with one of said blocks, and the rim plates for pivotally supporting the section, and a locking means carried by the second block and engageable with the plates to hold the section in either of its two positions.

5. A wheel comprising spaced rim plates, a plurality of tread sections interposed therebetween, each of said sections being reversible, means for holding said section in fixed position between the plates when the section is in either of its two positions, each of said sections having oppositely arranged surfaces adapted to be positioned to serve as the tread of the wheel, each of said sections comprising two longitudinally curved plates, said plates being each on substantially the same radii, blocks interposed between the opposite end portions of the plates and secured thereto, means coacting with one of said blocks and the rim plates for pivotally supporting the section, a locking means carried by the second block and engageable with the plates to hold the section in either of its two positions, and a reinforcing web interposed between the plates of the section and between the blocks.

6. A wheel comprising spaced rim plates, a plurality of tread sections interposed therebetween, means for pivotally supporting each of said sections of the plates, each of said sections having oppositely arranged surfaces adapted to be positioned to serve as the tread of the wheel, each of said sections being provided with an opening therethrough, locking members working in the opposite end portions of said opening, means for causing said locking members to have movement one with respect to the other in both an outward and inward direction, said locking members when moved outwardly engaging the rim plates to lock the section in either of its two positions.

7. A wheel comprising spaced rim plates, a plurality of tread sections interposed therebetween, means for pivotally supporting each of said sections of the plates, each of said sections having oppositely arranged surfaces adapted to be positioned to serve as the tread of the wheel, each of said sections being provided with an opening therethrough, locking members working in the opposite end portions of said opening, one of said members being in threaded connection with the other, and means for coacting with the second member to hold the same against rotation, the first member being rotatable.

8. A wheel comprising spaced rim plates, a plurality of tread sections interposed therebetween, means for pivotally supporting each of said sections of the plates, each of said sections having oppositely arranged surfaces adapted to be positioned to serve as the tread of the wheel, each of said sections being provided with an opening therethrough, locking members working in the opposite end portions of said opening, one of said members being in threaded connection with the other, means for coacting with the second member to hold the same against rotation, the first member being rotatable, and means coacting with said locking members when retracted to hold the same against outward movement.

In testimony whereof I hereunto affix my signature.

WILLIAM E. VAIL.